(12) United States Patent
Oppermann et al.

(10) Patent No.: US 6,609,535 B2
(45) Date of Patent: Aug. 26, 2003

(54) REED VALVE AND METHOD OF MAKING SAME

(75) Inventors: Henry A. Oppermann, St. John, IN (US); Anton Wolf, Crown Point, IN (US); Anton F. Wolf, Jr., Crown Point, IN (US)

(73) Assignee: Henry A. Opperman, St. John, IN (US)

( * ) Notice: Subject to any disclaimer, the term of this patent is extended or adjusted under 35 U.S.C. 154(b) by 0 days.

(21) Appl. No.: 09/911,878

(22) Filed: Jul. 24, 2001

(65) Prior Publication Data
US 2003/0019527 A1 Jan. 30, 2003

(51) Int. Cl.[7] .......................... F16K 15/16; F02B 75/02
(52) U.S. Cl. .................. 137/512.15; 137/855; 137/856; 123/65 V; 123/73 V
(58) Field of Search ............................ 137/512.15, 855, 137/856; 123/65 V, 73 V

(56) References Cited

U.S. PATENT DOCUMENTS

| | | | | |
|---|---|---|---|---|
| 3,905,340 A | * | 9/1975 | Boyesen | 123/73 A |
| 5,036,806 A | * | 8/1991 | Rarick | 123/65 V |
| 5,143,027 A | * | 9/1992 | Bergeron | 123/65 V |
| 5,243,934 A | * | 9/1993 | Boyesen | 123/65 V |
| 5,245,956 A | * | 9/1993 | Martin | 123/73 V |
| 5,247,912 A | * | 9/1993 | Boyesen et al. | 123/65 V |
| 5,370,088 A | * | 12/1994 | Nakamura | 123/65 V |
| 5,687,767 A | * | 11/1997 | Bowers | 128/205.24 |
| 5,794,654 A | * | 8/1998 | Marvonek et al. | 137/512.15 |
| 6,357,473 B1 | * | 3/2002 | Porter et al. | 137/512.15 |

FOREIGN PATENT DOCUMENTS

JP  58046276 A  *  3/1983  .................. 137/855

* cited by examiner

Primary Examiner—Michael Powell Buiz
Assistant Examiner—Ramesh Krishnamurthy
(74) Attorney, Agent, or Firm—Welsh & Katz, Ltd.

(57) ABSTRACT

A reed valve includes a generally wedge shaped reed cage or block defining a fluid flow passage and having substantially coplanar discharge ports. A reed is mounted at a common hinge end to the reed cage and has a plurality of petals each of which overlies a corresponding one of the ports. The petals have predetermined edge profiles to establish different transverse widths at their hinge axes so that the petals overlying outer low pressure zones in the reed cage lift from their port closing positions at a lower fluid pressure than the petals that overlie higher pressure zones in the reed cage, thereby providing multiple stage lifting and reflex action by the reed petals relative to the reed cage ports.

33 Claims, 6 Drawing Sheets

REED VALVE AND METHOD OF MAKING SAME

BACKGROUND OF THE INVENTION

The present invention relates generally to reed valves for controlling fluid intake into or through fluid passages as in internal combustion engines and the like, and more particularly to improved reed designs that provide significantly improved performance in controlling air and fuel flow in a two-cycle engine while eliminating undesirable back flow and pressure fluctuations into the air/fuel source.

Two cycle engines use an air induction system the efficiency of which is dependent on the precise timing and optimized transfer of air and fuel mixtures drawn into the combustion chamber through an induction path during the suction/pressure stroke of the piston. The method of controlling the intake of a fresh charge into the crankcase of a two-cycle engine has been the subject of much research and investigation. Various devices have been tried in an effort to increase the amount of fresh charge drawn into the crankcase during each operating cycle. Disc valves, piston port valves and reed valves are the most common such devices in use today. Understanding the dynamic behavior of the two-cycle engine reed valves has been found to be relatively difficult due to the unsteady gas flow processes occurring in the exhaust and inlet ducts and the scavenge and combustion processes in the cylinder of a two-cycle type engine.

Reed valves conventionally employ a generally wedge shaped reed cage or block having at least one port covered by a flexible reed. The reed is attached at an upstream end to the reed cage such that its unattached opposite end may be lifted or flexed away from the port by negative pressure or suction created in the engine intake passage, thereby permitting air/fuel to be drawn into the engine. When the differential pressure acting on the reed reaches zero, the reed closes and both air/fuel flow into the engine and back flow through the reed valve is prevented. Reed valves also find application in controlling fluid flow through fluid passages in air conditioning compressors and similar devices to assure flow in only one direction through the associated device.

In high performance two-cycle engines, optimization of reed flex and reflex in reed valves is important to maximizing the piston's 360 degree cycle so as to charge the combustion chamber with the correct air/fuel mixture at optimum operating engine r.p.m. as it relates to temperature, air density, humidity and elevation. Traditional reed valves used as check valves for preventing back flow of fuel out the intake path of the carburetor employ simple reed petal designs using materials such as steel, fiberglass and epoxy bonded carbon fibers. The known reed designs facilitate relatively inexpensive manufacture, but are considered a compromise in their function to accomplish a complete seal at the induction port. In recent years, the need to accomplish more complete combustion and eliminate unburned fuel from escaping back into the atmosphere has increased due to both popular demand of the public at large and legislative efforts to improve fuel efficiency and reduce unused or spent gases from escaping into the atmosphere. Accordingly, a need exists for reed valves capable of accomplishing these goals while improving the performance of two-cycle engines, particularly at the higher engine r.p.m.

It follows that reed design and selection is critical to achieving maximum horsepower from a two-cycle engine because too much or too little air/fuel entering the engine during each cycle will cause a loss in performance. The amount of air and air/fuel that will flow past the reed is in part dependent on reed size (which is determined by the size of the reed cage ports) and reed flexibility. A flexible reed will allow more airflow than a stiffer reed at lower engine r.p.m., thus increasing low and mid-range acceleration. However, at higher r.p.m. a flexible reed may flutter causing a loss of seal so that a stiffer reed is necessary to control the airflow. Conversely, a stiffer reed will allow less air flow at lower engine r.p.m. and thereby inhibit low range and mid-range operating efficiency.

In addition to reed stiffness, reed response (also referred to as "reflex") is also important to improved performance. The faster a reed can respond, i.e., both open and spring back in response to pressure changes acting on the reed, the more accurate the desired volume of fuel and air that will enter the engine crankcase before the reed closes.

It can thus be appreciated that for a given reed cage design, any improvement in the flexibility and response characteristics of the associated reed can add significantly to the performance of the engine with which the reed valve is used throughout the full engine operating range.

BRIEF SUMMARY OF THE INVENTION

A general object of the present invention is to provide a novel reed design for reed valves used to control fluid flow through a fluid passage as in internal combustion engines and other fluid passages.

A more particular object of the present invention is to provide a novel reed design for use in reed valves wherein the reed has significantly improved reflex and port sealing ability.

Another object of the present invention is to provide novel reed designs for use in reed valves wherein each reed has a plurality of petals having selective reflex characteristics such that the various petals are responsive to different pressure forces acting on the petals when disposed in port closing and opening positions on a reed cage or block controlling flow through a fluid passage.

Still another object of the present invention is to provide various novel reed designs for use in reed valves wherein each reed defines a plurality of generally parallel petals each of which is adapted to overlie a port in a reed cage or block, the petals extending in the direction of flow through the reed cage and being integrally interconnected at a hinge end of the reed so that the petals establish axially aligned hinge axes transverse to the petals. The reed petals are selectively configured at their hinge ends to create different reflex characteristics in the petals so that petals corresponding to ports associated with lower pressure zones within the reed cage or block, such as proximate one or more of the reed cage lateral boundary surfaces, are operative to flex open at lower pressures than reed petals that overlie and control flow through ports at higher pressure zones in the reed cage.

In carrying out the present invention, various embodiments of reeds are provided for use with a reed cage or block having a plurality of generally coplanar ports through which fluid may flow from a fluid source, such as a carburetor in an internal combustion engine. Each reed has a plurality of generally parallel reed petals integrally joined at a mounting hinge end of the reed. Each reed petal has generally parallel longitudinal marginal edges that terminate at the hinge end of the petal in predetermined edge surface profiles so as to establish both stress relief and a predetermined hinge width for each petal. The transverse hinge widths of the petals are selectively varied to effect predetermined flex and reflex for the corresponding petals. The hinge widths of the petals associated with one or more lower pressure zones in the reed cage, for example, adjacent one or both of the lateral boundaries of the reed cage depending on the direction of fluid flow into the reed cage, are made smaller than the hinge widths of the petals associated with the higher pressure zones in the reed cage. The outer longitudinal marginal edges of the petals associated with the lower pressure zones in the cage are tapered inwardly at their hinge ends so as to establish a predetermined flex gradient at the hinge end of the petal that differs from the flex at the hinge ends of the petals associated with the higher pressure zones in the reed cage, thereby causing the petals associated with the lower pressure zones to undergo a complex cantilever action and more readily lift from seated sealing positions on their respective reed cage ports and subsequently re-seal the ports. Reed stops are preferably mounted on the reed cage to limit outward flexing of the reed petals from their port closing positions.

The known prior reed designs have reed petals that are of substantially constant lateral width throughout their full lengths, or are otherwise symmetrical about their longitudinal centerlines, and exhibit uniform cantilever flex as they lift about their hinge axis ends. The various reed designs of the present invention undergo a complex cantilever flexing action due to the taper edge profiles provided at the hinge ends of selected petals so that these petals are not symmetrical about their longitudinal centerlines. By selective adjusting of the taper angles, the corresponding petals undergo a progressive change in flex characteristics from their hinge axis throughout the tapered edge profile length of the petal. By selecting a predetermined petal edge profile taper angle and associated hinge axis width, a reed petal may be provided having flex and reflex properties that are optimum for a particular manufacturer's engine design.

The present invention thus provides reeds for use in reed valves wherein the reed petals undergo a multiple stage lifting relative to each other so that the reeds associated with one or more lower pressure zones in the reed cage or block are operative to flex open or lift from the reed cage at lower pressures (i.e. lower engine r.p.m.) than the one or more reed petals associated with higher pressure zones due to the selective reduction in petal hinge width and the hinge area taper configuration of each outside petal. The wider hinge widths of the one or more petals associated with higher pressure zones in the reed cage create greater rigidity and thereby reduced reflex for the corresponding petals and resist flexing away from their port closing positions at the lower pressures effective to flex open the petals associated with the lower pressure zones, while opening when subjected to increased pressure/suction at higher engine r.p.m., thus effectively producing a multiple-stage reed valve. The reeds are preferably made from carbon-fiber material of selective thickness so that, together with the reed petal hinge configurations, the reed petals resist flutter (defined as the state in which the reed petals do not fully close off their respective cage ports) at maximum engine r.p.m. (i.e. maximum back pressure) when reed oscillation tends to occur in response to reversal of the suction/pressure stroke of the piston.

Further objects and advantages of the present invention will become apparent from the following detailed description of the invention taken in conjunction with the accompanying drawings wherein like reference numerals designate like elements throughout the several views.

DETAILED DESCRIPTION OF THE INVENTION

Figure 1:
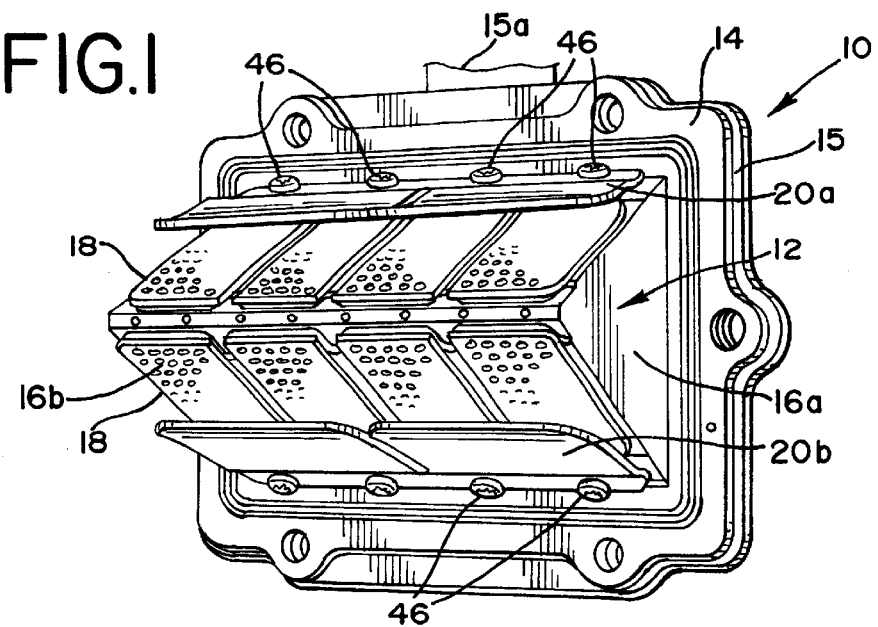
FIG. 1 is a perspective view of a reed valve employing four-petal reeds in accordance with one embodiment of the present invention.
Figure 2:
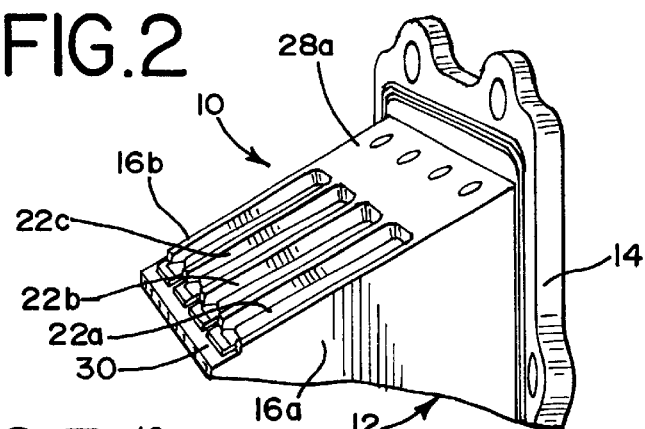
FIG. 2 is a fragmentary perspective view illustrating the upper half of the reed cage or block shown in FIG. 1 but having the upper four-petal reed and associated reed stop member removed.
Figure 3:
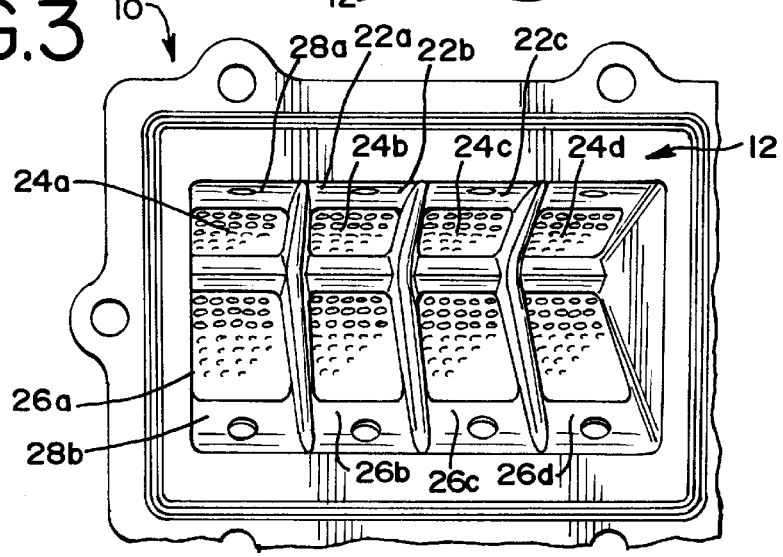
FIG. 3 is an end elevational view of the reed cage or block of FIG. 1 but viewed from the upstream input end of the cage or block.

Referring now to the drawings, and in particular to FIGS. 1–3, the present invention is shown by way of illustration as being embodied in a reed valve, indicated generally at 10. Briefly, the reed valve 10 includes a reed cage or block, indicated generally at 12, having a mounting flange 14 that enables the reed valve to be sandwiched between a suitable mounting flange on the crankcase (not shown) of an internal combustion engine, such as a two-cycle combustion engine, and a housing, a fragmentary portion of which is shown at 15 in FIG. 2, defining a fluid flow passage 15a to which a carburetor is connected so that air and air/fuel from the carburetor is caused to pass through the reed valve in a direction from the carburetor to the engine crankcase as is known. The reed cage or block 12 has a generally wedge shaped portion 16 that, when the reed valve is mounted on an internal combustion engine, extends into a reed valve receiving chamber generally referred to as the engine intake port casting. The wedge shaped portion 16 defines generally upwardly and downwardly facing discharge ports as hereinafter described. In the embodiment illustrated in FIG. 1, the wedge shaped cage or block portion 16 has a pair of identical four-petal reeds, indicated at 18, mounted thereon so that each reed overlies, or underlies as the case may be, the upper and lower discharge ports of the reed cage. A pair of reed stops, indicated at 20a and 20b, are conventionally, but not necessarily, mounted on the reed cage or block 12 so as to overlie and underlie the reeds 18 and limit lifting movement of the reeds away from their closed positions with the reed cage ports, as will be described. The reeds 18 are operative to seal with their respective reed cage discharge ports during a piston compression stroke, but flex or lift away from the respective ports in a multiple stage or progressive manner during the power stroke of the piston so that the reed petals of the reeds that overlie lower pressure zones in the reed cage flex or lift open in response to a lower pressure acting to open or lift them than the pressure necessary to life or open the reed petals that overlie higher pressure zones in the reed cage. As will become apparent, the multiple stage opening or flex opening response of the reed petals facilitates more effective engine performance throughout the full engine operating range.

The reed cage or block 12 is of known construction and is preferably made of a suitable corrosive resistant material, such as cast aluminum. The reed cage includes a pair of laterally spaced generally parallel triangular-shaped end plates or end walls 16a and 16b that may be formed integral with the mounting flange 14 and establish the lateral boundaries for the fluid flow path through the reed cage. As illustrated in FIG. 3, the wedge-shaped portion 16 of the reed cage or block 12 is divided into generally equal width ports or zones by ribs as indicated at 22a–c. In the embodiment of FIGS. 1–3, there are three ribs 22a–c that lie in planes parallel to the end walls 16a,b and divide the fluid flow path into four equal width ports 24a–d facing generally upwardly, and four ports 26a–d facing generally downwardly. The ribs 22a–c are formed integral with mounting plate portions 28a and 28b of the reed cage and have their apex ends formed integral with or otherwise fixed to and rigidly maintained in equal spaced relation by a transverse member 30 formed at the apex of the wedge-shaped end plates or end walls 16a,b. The end walls or plates 16a,b, ribs 22a–c, mounting plates 28a,b and transverse connecting members 30 have outwardly exposed coplanar surfaces that face upwardly and downwardly from the triangular end plates 16a,b and define reed sealing surfaces peripherally of each port 24a–d and 26a–d. The ribs 22a–c thereby establish upwardly and downwardly facing generally rectangular fluid flow ports between the end plates 16a,b that extend from the free edges of the mounting plates 28a,b to the transverse connecting member 30. If desired, a resilient valve seat (not shown) may be provided on the upper and lower coplanar surfaces of the reed cage that define the periphery of each port 24a–d and 26a–d of the four-port reed cage of FIG. 1, as is known.

Figure 4:
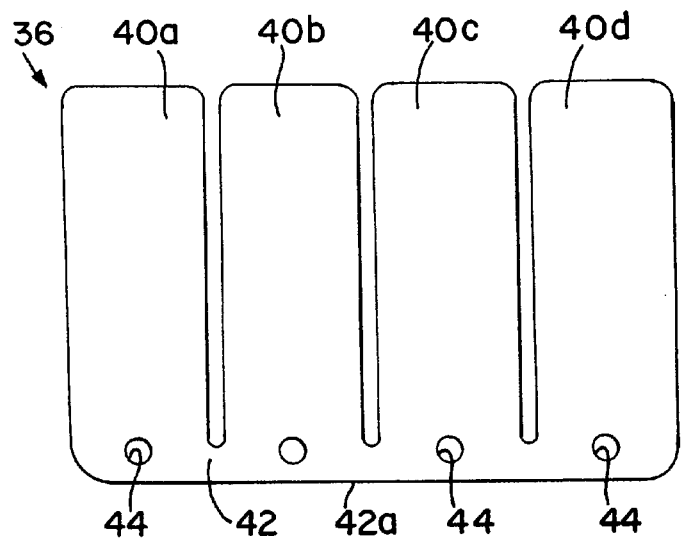
FIG. 4 is a plan view of a stock fiberglass four-petal reed as known in the prior art.
Figure 5:
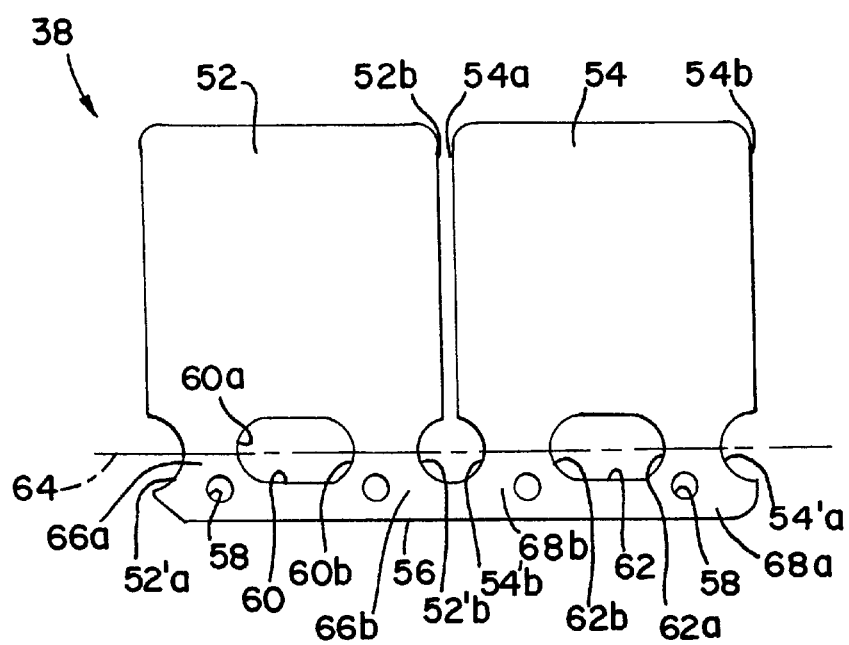
FIG. 5 is a plan view of a two-petal reed made of a carbon fiber material in accordance with the prior art.

FIGS. 4 and 5 illustrate known prior art reeds, indicated generally at 36 and 38, respectively, for use in reed valves. The reed 36 is made of a uniform thickness fiberglass and is commercially available as a four-petal reed having four parallel petals 40a–d integrally interconnected at a hinge end 42 of the reed. The petals 40a–d are identical in size and each petal has parallel rectilinear longitudinal marginal edges so that the petals are of equal constant transverse width throughout their lengths. Mounting screw holes 44 are provided along the hinge end 42 so that their centers lie on a line parallel to a transverse marginal edge 42a of the reed and each screw hole center lies generally on the longitudinal centerline of a corresponding one of the petals 40a–d. The screw holes 44 facilitate mounting of a pair of the reeds 36 in overlying relation to the ports in the reed cage or block 12 of FIG. 1 between the reed stops 20a,b and the underlying mounting plate portions 28a,b on the reed cage, as by screws 46. By making the reed petals 40a–d of equal uniform thickness and transverse width throughout their lengths, the reed petals have substantially equal flex and reflex characteristics throughout their lengths. As is known, fluid flow through the reed cage or block 12 generally in a direction parallel to the longitudinal axis of the reed cage creates different pressure zones at the lateral boundaries defied by the end walls 16a and 16b, and thereby at the outer ports 24a,d and 26a,d, than the fluid pressure at the middle or intermediate ports 24b,c and 26b,d. The reed petals 40a and 40d of reed 36 that overlie the outside lower pressure ports 24a, 24d and 26a, 26d in the reed cage require the same threshold pressure force to lift them from their port sealing positions as the petals 40b and 40c that overlie the higher pressure ports or zones 24b,c and 26b,c in the reed cage.

The reed 38 of FIG. 5 is also of known design and may also be employed with the four port reed cage or block 12 of FIGS. 1–3. The reed 38 is made of epoxy bonded carbon fiber material and includes a pair of identical petals 52 and 54 that are of uniform thickness and formed integral with a hinge or mounting end 56 having mounting screw holes 58 that facilitate mounting of a pair of the reeds 38 on the reed cage 12 similar to the reeds 36. The petals 52 and 54 have parallel rectilinear longitudinal marginal edges 52a,b and 54a,b, respectively. Each of the rectilinear marginal edges 52a,b and 54a,b terminates adjacent the hinge end 56 in a semicircular profile edge surface, indicated at 52'a, 52'b, 54'a and 54'b. The profile edge surfaces 52'a,b and 54'a,b are of equal radii and are transversely aligned with equal radii semicircular end surfaces 60a,b and 62a,b of elongated openings 60 and 62, respectively. The semicircular edge profile surfaces 52'a,b and 54'a,b and corresponding semicircular edge surfaces 60a,b and 62a,b establish a pair of equal width hinge axes for each petal 52 and 54, indicated at 42hw, 52'hw, 54hw and 54'hw, that lie on a line 64 transverse to the longitudinal axes of the petals. Because the widths of the petal hinge axes are identical, the petals respond in a substantially identical manner to fluid pressure buildup within the reed cage and lift about their hinge axes from closed positions on ports of a reed cage equally when the engine piston is undergoing a compression stroke. The petals also respond in a substantially identical manner to close when the engine piston is undergoing a power stroke so that the petals prevent back flow through the reed valve. Because the reed petals 52 and 54 have equal width hinge widths 52hw, 52'hw, 54hw and 54'hw and equal profile edge surfaces 52'a, 52'b and 54'a and 54'b adjacent their hinge axes, the flex and reflex characteristics of petals 52, 54 are equal and the petals flex equally as the petals lift about their hinge axes. Thus, the petals 52 and 54 do not respond in a stepped manner to different pressure zones in the reed cage, but open and close in unison.

Figure 6:
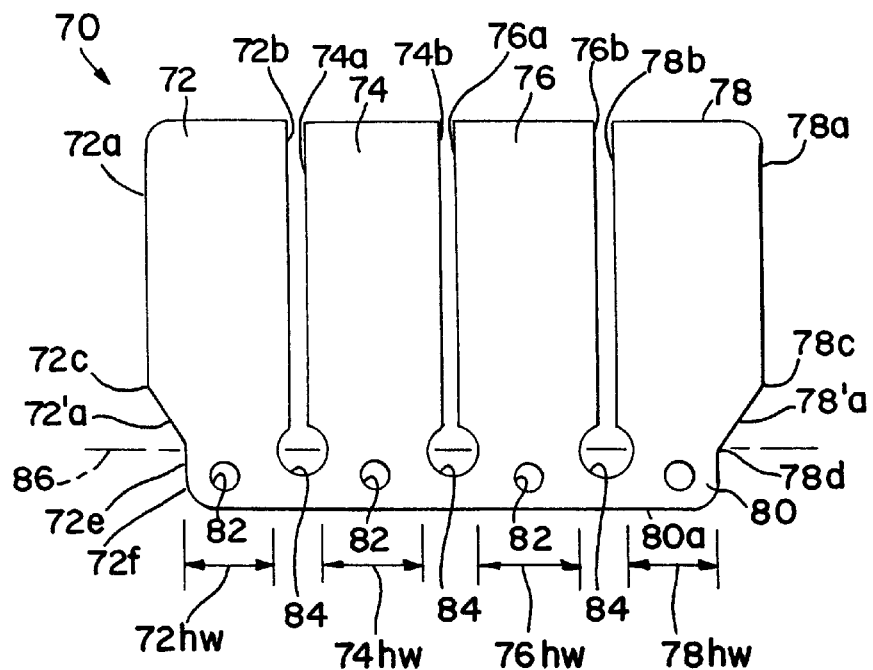
FIG. 6 is a four-petal reed in accordance with one embodiment of the present invention as employed in the reed valve of FIG. 1.

FIGS. 6–13 illustrate various embodiments of reeds in accordance with the present invention. FIG. 6 illustrates a four-petal reed, indicated generally at 70, having four petals 72, 74, 76 and 78 that are integrally interconnected at a hinge base 80. The hinge base 80 has screw mounting holes 84 the centers of which lie on a transverse line parallel to a marginal edge 80a of the hinge end 80 and on the longitudinal centerlines of the petals so as to enable a pair of the reeds 70 to be mounted on the reed cage or block 12 between the reed stops 20a,b and the underlying mounting plates 28a,b by screws 46. As will be described, the petals 72, 74, 76 and 78 are sized to fully cover and seal with the periphery of each of the reed cage ports 24a–d and 26a–d, respectively. Each of the reed petals 72, 74, 76 and 78 has generally rectilinear longitudinal marginal edge surfaces, indicated at 72*a,b*, 74*a,b*, 76*a,b* and 78*a,b*. The petals 72 and 78 of reed 70 are symmetrical about a longitudinal centerline of the reed and may be referred to as the outer or outside petals which overlie the lower pressure zones or ports 24*a,b* and 26*a,b* when a pair of reeds 70 are mounted on the reed cage 12. The petals 74 and 76 are also symmetrical to each other about the longitudinal centerline of reed 70 and are termed the intermediate or middle petals which overlie the higher pressure zones at the reed cage ports 24*b,c* and 26*b,c*. The rectilinear longitudinal marginal edges of the intermediate petals 74 and 76 terminate at their hinge ends in equal size semicircular arc portions of generally circular openings 84 the centers of which lie on a common transverse hinge axis represented by line 86. The petals 74 and 76 are symmetrical about their longitudinal axes and have equal hinge widths, as designated at 74*hw* and 76*hw*, respectively. By making the reed petals 74 and 78 of equal thickness, the flex and reflex characteristics of the intermediate petals are equal for each petal.

The outer longitudinal marginal edges 72*a* and 78*a* of the outer petals 72 and 78 terminate adjacent their hinge ends in tapered edge surfaces, indicated at 72'*a* and 78'*a*, respectively. The tapered edge surfaces 72'*a* and 78'*a*, which may alternatively be termed profile edge surfaces, are rectilinear and extend from intersection with the corresponding longitudinal marginal edge surfaces 72*a* and 78*a*, as indicated at uniform radius edge surfaces 72*c* and 78*c*, respectively, inwardly toward the longitudinal axes of the petals 72 and 78. The tapered edge surfaces 72'*a* and 78'*a* intersect laterally opposite ends of the reed hinge end 80 at uniform radius concave edge surfaces 72*d* and 78*d*, respectively, that in turn blend into corresponding hinge end edge surfaces 72*f* and 78*f* disposed normal to the marginal edge 80*a* of the hinge end. The hinge end marginal corners 80*b* are preferably of equal radius curvature but could be formed as substantially square corners if desired.

Figure 6A:
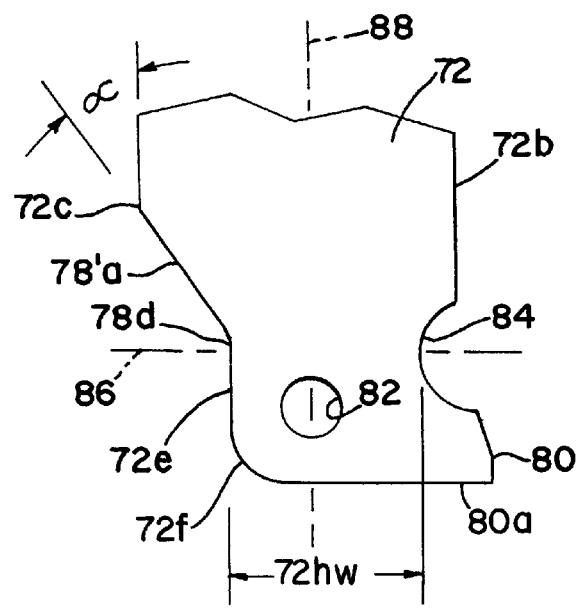
FIG. 6A is a fragmental view, on an enlarged scale, of a portion of the reed shown in FIG. 6.

The inner longitudinal marginal edges 72*b* and 78*b* of petals 72 and 78 terminate at their hinge ends in semicircular arc portions of the generally circular openings 84 that also define the hinge axes of petals 74 and 76. The centers of curvature of the uniform radius edge surfaces 72*d* and 78*d* lie on the transverse hinge axis line 86 so as to establish equal hinge axis widths 72*hw* and 78*hw* for the outer petals 72 and 78, respectively, that lie on the transverse hinge axis line. The tapered edge surfaces 72'*a* and 78'*a* are formed to intersect the reed base 80 so as to create hinge widths 72*hw* and 78*hw* that are of less transverse width than the hinge widths 74*hw* and 78*hw* of the intermediate petals 74 and 76. In this manner, the flex and reflex characteristics of the outer petals 72 and 78 are different than the flex and reflex characteristics of the intermediate petals 74 and 76 so that the outer petals lift off their respective outer reed cage ports 24*a,d* and 26*a,d* in response to a lower pressure within the reed cage at the outer ports than the pressure at the reed cage ports 24*b,c* and 26*b,c* necessary to lift the intermediate petals 74 and 76. During operation of an internal combustion engine employing an eight-port reed valve (four upper and four lower ports) having a pair of reeds 70 mounted on the reed cage to overlie the reed ports will result in the outer petals lifting or flexing from their sealed positions with the corresponding reed cage ports at a lower pressure than the intermediate petals 74 and 76, thereby providing a two-stage reed wherein the middle petals 74 and 76 lift or flex from their respective reed cage at a predetermined higher engine r.p.m. than required to lift the outer petals 72 and 78 from their closed port positions. The tapered profile surfaces 72'*a* and 78'*a* are configured so that when the outer petals 72 and 78 overlie the outer ports on the reed cage, the reed ports are fully covered by the outer petals. The angle alpha (FIG. 6A) is selected to create predetermined flex characteristics for the outside petals 72 and 78 to optimize performance with the engines of different manufacturers. For example, by increasing the angle alpha for each taper surface 72'*a*, 78'*a* while maintaining its corresponding point of intersection 72*d*, 78*d* with the reed base end 80 so as to establish predetermined hinge widths 72*hw* and 78*hw*, the flex of the hinge ends of the outer petals 72 and 78 may be varied to achieve the optimum flex performance for a particular engine with which the reed valve is used. A smaller angle alpha will create a longer taper edge 72'*a* and 78'*a* than will a larger angle alpha, assuming the inner ends 72*d*, 78*d* of the taper edges remain the same in respect to establishing constant hinge widths 72*hw* and 78*hw* for petals 72 and 78. In one embodiment of the reed 70, the angle alpha for the outer petals 72, 78 was formed as an included angle in the range of approximately about 19 degrees for a small angle taper to about 35 degrees for a larger angle taper. If the points of intersection 72*c*, 78*c* of the taper edge surfaces 72*a* and 78*a* with the corresponding outer marginal edges 72*a* and 78*a* are maintained at equal distances from the marginal edge 80*a* of the reed hinge end 80, the larger taper angle alpha will create smaller hinge widths 72*hw* and 78*hw* than a smaller taper angle alpha. Thus, for a given equal radius for the openings 84, the taper angle alpha will determine the difference in hinge widths between the outer petals 72, 78 and the middle or intermediate petals 74, 76.

In addition to forming reduced hinge widths for the outer petals 72 and 78, the tapered profile edge surfaces 72'*a* and 78'*a* in combination with the corresponding semicircular arc surfaces 100 create a complex cantilever action for the corresponding petals. For example as the outer petals 72 and 78 lift from their port closing positions, each petal will begin to contact the stop 20*a* or 20*b* progressively from its hinge axis toward its tip end. Because the length of the petal from its hinge axis to the taper surface edge intersection point 72'*a*, 78'*a* progressively changes in transverse cross section, the petal undergoes a complex cantilever action. Once the uniform transverse cross section portion of the petal engages the stop 20*a* or 20*b*, the petal thereafter undergoes a uniform cantilever action. Thus, the cantilever or flex characteristic of the petal is a function of the angle alpha and the hinge axis width. The tapered edge surfaces 72'*a* and 78'*a* also reduce the mass of the corresponding outer half of each of the outer petals, as considered to the left hand side of the longitudinal centerline 88 of petal 72 in FIG. 6A. In this manner, the pressure acting on the lower mass outer halves of the outer petals creates a torsional moment in the outer petals that counteracts the torsional moment acting in an opposite direction on the inner halves of the outer petals 72 and 78 that would otherwise tend to twist the outer petals about their longitudinal axes.

Figure 7:
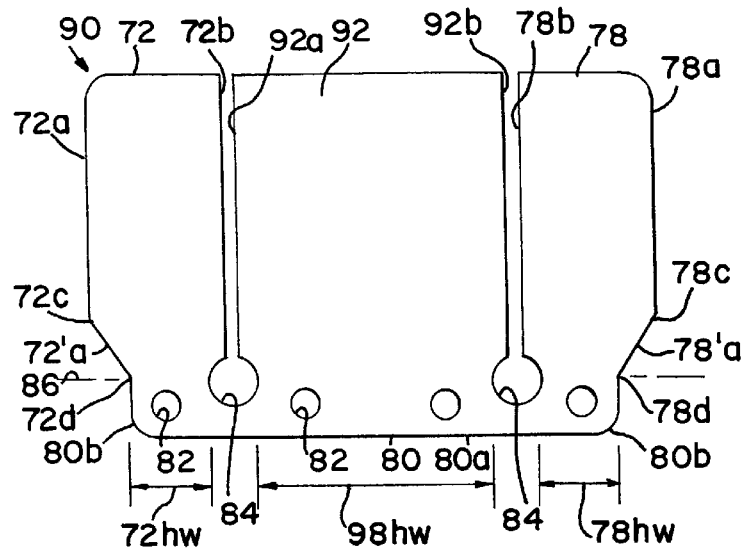
FIG. 7 is a plan view of a three-petal reed in accordance with another embodiment of the present invention.

FIG. 7 illustrates a three-petal reed, indicated generally at 90, that may be made of an epoxy bonded carbon fiber material. Elements of the reed 90 that are substantially identical to corresponding elements of reed 70 are designated by like reference numbers. The reed 90 has a pair of outer petals 72 and 78 and a single intermediate petal 92 that is a combination of the previously described petals 74 and 76 formed as a single middle or intermediate petal having a hinge width 98*hw*. The outer petals 72 and 78 have hinge widths 72*hw* and 78*hw*, respectively, that are substantially equal to the corresponding hinge widths of the outer petals of reed 70 and significantly smaller than the hinge width 92*hw* of the middle petal 92.

When a pair of the reeds 90 are mounted on the reed cage or block 12, the outer petals 72 and 78 will lift from their cage port closing positions at pressures within the reed cage less than the pressure required to open or lift the middle petals 92 that cover reed cage ports 24c,d and 26c,d. Such lower pressures exist during low engine r.p.m. The middle petals 92 are operative to lift from the associated reed cage ports 24b,c and 26b,c at higher engine r.p.m. so that the reeds 90 provide a multiple stage, namely, two-stage, mode of operation responsive to pressure buildup in the reed cage. Similarly, the flex and reflex characteristics, i.e., stiffness, of the center petal 92 will cause it to return to its reed cage port closing position prior to closing of the outer petals 72 and 78 due to the greater, and thus more rigid, hinge width 92hw. The taper profile edge surfaces 72'a and 78'a on the outer petals 72 and 78 of reed 90 perform the same function as the taper edge surfaces on reed 70, and thus allow for creating predetermined flex and reflex characteristics for the outer petals best suited to a particular manufacturers engine and reed cage.

Figure 8:
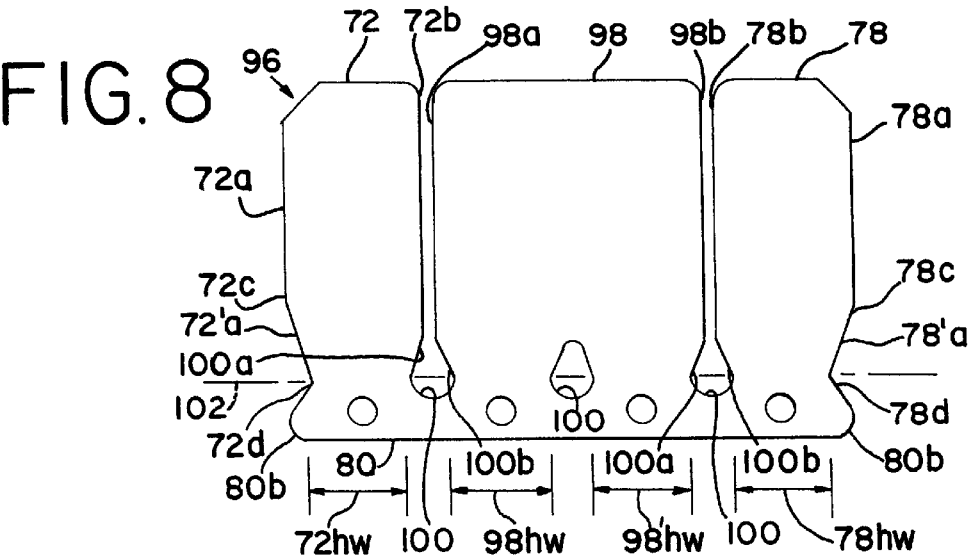
FIG. 8 is a plan view of a three-petal reed constructed in accordance with still another embodiment of the present invention.
Figure 8A:
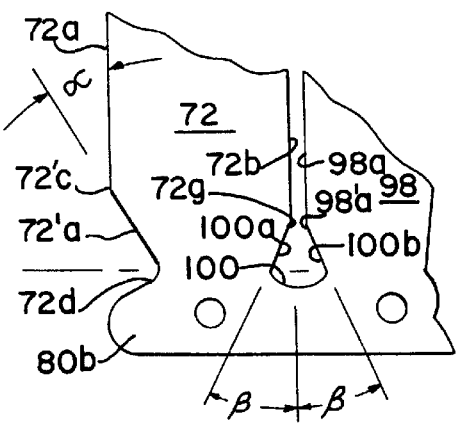
FIG. 8A is a fragmentary view, on an enlarged scale, of the reed of FIG. 8.

FIGS. 8 and 8A illustrate another embodiment of a reed, indicated generally at 96, that is similar to the reed 90 in that it comprises a three-petal reed having two outer reed petals 72 and 78 and a single middle or intermediate reed petal 98. The reed 96 differs from the reed 90 primarily in that the inner rectilinear longitudinal edge surfaces 72b and 78b of the outer petals 72 and 78, and the laterally opposite longitudinal marginal edges 98a and 98b of the intermediate petal 98, terminate at their hinge ends in generally equal size diamond shaped openings 100. The diamond shaped openings 100, which may be considered as upside down or inverted diamond shapes, are defined in part by tapered edge surfaces 100a and 100b. The tapered edge surfaces 100a,b intersect, respectively, the corresponding longitudinal marginal edges 72b and 78b of the outer petals 72 and 78 at 72g and 78g, respectively, and the longitudinal marginal edges 98a and 98b of the intermediate petal 98 at 98'a and 98'b. The transverse minor axis dimensions of the diamond shaped openings 100 lie on a transverse hinge axis 102 that also intersects the inward-most ends 72d and 78d of the tapered profile surfaces 72'a and 78'a on the outer petals. In addition to cooperating with the corresponding outer petal tapered profile edge surfaces 72'a and 78'a to establish the hinge widths 72hw, 78hw of the outer petals 72 and 78, the tapered edge surface 100a of the inverted diamond shaped opening 100 that intersects the marginal edge 72b may be formed at a predetermined taper angle beta (FIG. 8A) so as to create a predetermined complex cantilever action for petal 72 in cooperation with the outer taper profile edge 72'a. Thus, the tapered profile edge surface 72'a and the tapered edge surface 100a are codependent variables in establishing the complex cantilever action of the hinge axis end of petal 72 as it lifts and progressively engages the corresponding stop 20a or 20b. Changing the angles alpha and/or beta will effect a change in the complex cantilever action of the corresponding outer petal and will also impact on the flex and reflex characteristics of the petal.

The middle petal 98 also has a diamond shaped opening 100 therethrough the major axis of which lies on the longitudinal centerline of the middle petal, and the transverse minor axis of which lies on the hinge axis 102. In this manner, the tapered profile surfaces 72'a and 78'a and the corresponding opposite tapered edge surface 100a of the adjacent diamond shaped opening 100 create equal hinge widths 72hw and 78hw for the outer petals 72 and 78. The three diamond shaped openings 100 also establish equal hinge widths 98hw and 98'hw for the middle petal 98, each of which is of lesser or shorter hinge width than the hinge widths of the outer petals 72 and 78. The sum of the middle petal hinge widths 98hw and 98'hw is greater than either of the outer petal hinge widths. Thus, the reed 96 provides multiple stage or sequence opening or lift of the outer petals 72 and 78 from their port closing positions relative to the lift or opening of middle petal 98 from its port closing position in that the outer petals lift in response to lower pressure (lower engine r.p.m.) at the cage ports 24a,d and 26a,d than the pressure required to lift the middle petal 96 that occurs at higher engine r.p.m. after which the outer and middle petals lift or continue to open simultaneously. The laterally opposite ends of the hinge end 80 of reed 96 may be formed as uniform radius rounded corners 80b that merge through straight edge surfaces with the ends 72d and 78d of the tapered profile edges 72'a and 78'a, respectively, and preferably form included angles of approximately 90° with the profile edges 72'a, 78'a.

Figure 9:
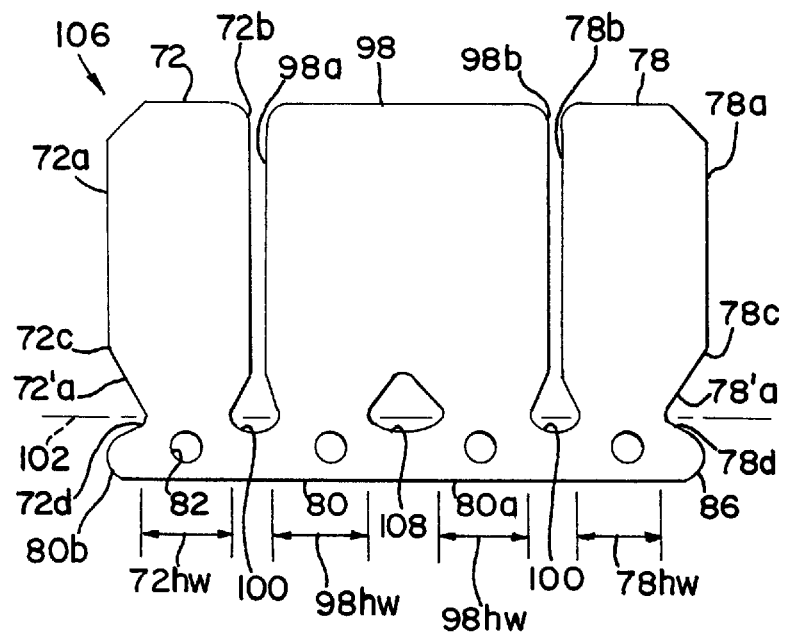
FIG. 9 is a plan view of a three-petal reed constructed in accordance with another embodiment of the present invention.

FIG. 9 illustrates another embodiment of a reed, indicated generally at 106, that is generally similar to the reed 96 in that it includes outer petals 72 and 78 and an intermediate or middle petal 98. The reed 106 differs from the reed 96 in that a diamond shaped opening 108 is formed at the hinge axis and centrally of the middle petal 98 that is larger in size than the diamond shaped openings 100 that form taper edge profile surfaces at the hinge ends of the outside and middle petals 72, 78 and 98 of reed 96. By increasing the size of the diamond shaped opening 108, the hinge widths 98hw and 98'hw of the middle petal 98 are reduced in width from the corresponding hinge widths for the middle petal 98 of reed 96. This controls the midrange r.p.m. band of an engine by changing the flex characteristics of the middle petal 98. The hinge axis widths 98hw and 98'hw of petal 98 on the reed 106 are equal to each other but shorter or of less width than the hinge axis widths 72hw and 78hw of the outer petals 72 and 78 of reed 106 so that the outer petals respond, i.e., lift, in response to lower pressure in the reed cage than that required to lift the middle petal 98 of reed 96.

Figure 10:
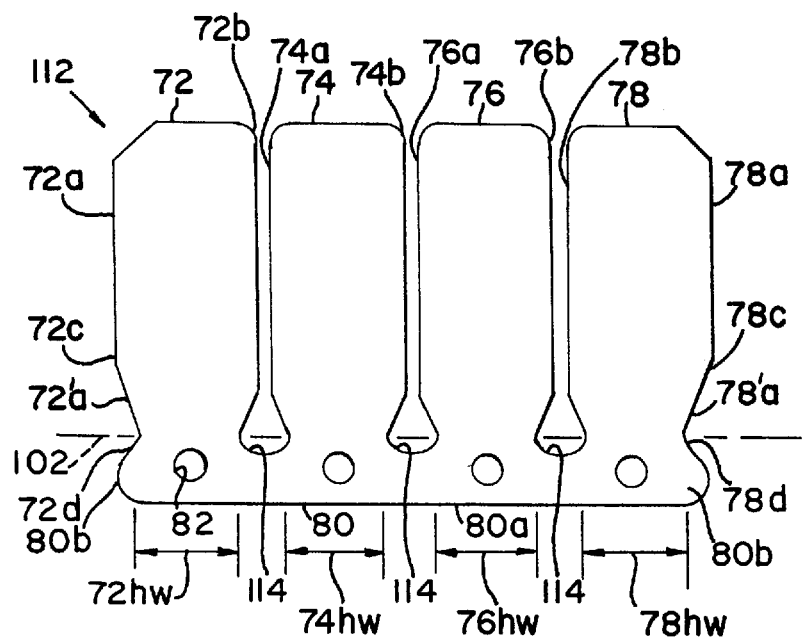
FIG. 10 is a plan view of a four-petal reed constructed in accordance with another embodiment of the present invention.

FIG. 10 illustrates another embodiment of a four-petal reed, indicated generally at 112, that may also be made of epoxy bonded carbon fiber material and is generally similar to the aforedescribed reed 70. The reed 112 differs in that rather than utilizing substantially circular openings at the hinge ends of the petals, such as illustrated at 84 in FIG. 6, the reed 112 has inverted diamond shaped openings or recesses 114 formed at the hinge ends of the petals 72, 74, 76 and 78 as shown in FIG. 10. The diamond shaped openings 114 have their minor transverse axes disposed on a transverse hinge axis 102 of reed 112 and are configured to establish hinge widths, designated at 74hw and 76hw, for the middle petals 74 and 76 that are greater in width than the hinge widths 72hw and 78hw for the outer petals 72 and 78. It will be appreciated that the diamond shaped openings or recesses 114, by virtue of their tapered edge contours, create different flex and reflex characteristics at the hinge axis ends of the petals 72, 74, 76 and 78 than created by the circular openings 84 utilized in the reed 70.

Figure 11:
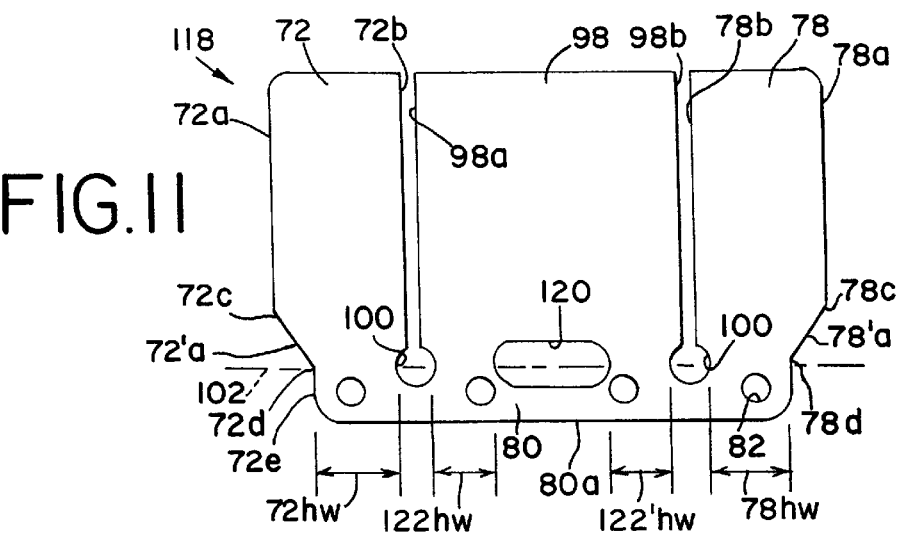
FIG. 11 is a plan view of a three-petal reed constructed in accordance with another embodiment of the present invention.

FIG. 11 illustrates another embodiment of a reed, indicated generally at 118, in accordance with the present invention. The reed 118 may also be made from an epoxy bonded carbon fiber material and is generally similar in configuration to the aforedescribed reed 90. The reed 118 differs from reed 90 in that the center petal 98 of reed 118 has its hinge axis divided by an elongated opening 120 to establish two axially aligned hinge widths, designated at 122hw and 122'hw, rather than a single uninterrupted wider hinge width as at 92hw of reed 90. The shorter hinge widths 122*hw* and 122'*hw* change the flex and reflex characteristics of the middle petal 92, enabling it to lift from its closed position with the middle ports of a reed cage at a lower pressure than required to lift or open the middle petal 92 of reed 90. The sum of the hinge widths 122*hw* and 122'*hw* are greater than either of the hinge widths 72*hw* or 78*hw* for the outer petals 72 and 78 so that the outer petals flex or open from their closed position at a lower pressure within the reed cage than necessary to lift open the middle petal 98 when mounted on the reed cage 12.

Figure 12:
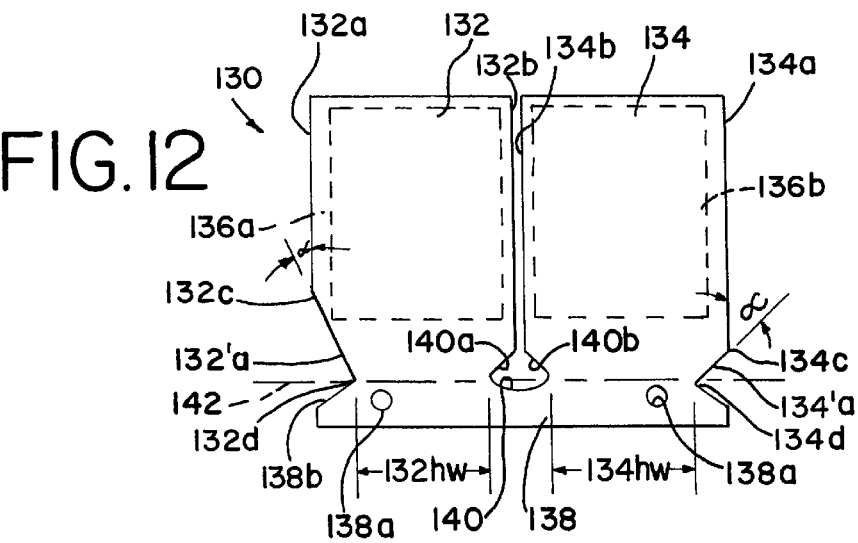
FIG. 12 is a plan view of a two-petal asymmetrical reed constructed in accordance with another embodiment of the present invention.

FIG. 12 illustrates another embodiment of a reed, indicated generally at 130, that is termed an asymmetrical reed. The reed 130 finds particular application with reed valves wherein the direction of fluid flow into the reed cage is at an angle relatively to the longitudinal axis of the reed cage. In this situation, the fluid pressure within the reed cage vanes across the lateral width of the reed cage as a result of fluid flow being at a higher velocity adjacent the side of the reed cage impinged by the incoming fluid flow, i.e., air and air/fuel mixture from a carburetor, while the fluid flow at the opposite side of the reed cage undergoes eddies that reduce the velocity of flow and thus the fluid pressure acting on an associated reed petal. Such a situation is particularly prevalent in offset carburetor applications such as in motorcycle engines.

The reed 130 may be made of a bonded carbon fiber material and includes a pair of petals 132 and 134 each of which has parallel rectilinear marginal edges 132*a*, 132*b* and 134*a* and 134*b*, respectively. The petals 132, 134 are of equal transverse width along the major portion of their longitudinal lengths so as to cover rectangular discharge ports in a reed cage, such as indicated in phantom at 136*a* and 136*b* in FIG. 12. The reed petals 132 and 134 are interconnected at a hinge end 138 of the reed so that the petals are cantilevered outwardly from the hinge end in parallel spaced relation. The hinge end 138 has a pair of screw mounting holes 138*a*.

The inner marginal edges 132*b*, 134*b* of petals 132, 134 terminate at their hinge ends in an opening 140 of inverted diamond shape having its major axis coinciding with the longitudinal center axis of reed 130. The tapered profile edges 140*a,b* of the diamond shaped opening 140 are inclined from points of intersection with the inner marginal edges 132*b*,134*b* of petals 132,134 toward their respective longitudinal centerlines. The minor transverse axis of the diamond shaped opening 140 lies on the hinge axis of reed 130, as represented by line 142.

The outer marginal edge 132*a* of petal 132 terminates at its hinge axis end in a tapered profile edge surface 132'*a* of generally similar size and configuration as the aforedescribed tapered profile edge surfaces 72'*a*. In this manner, the tapered edge surface 132'*a* is tapered inwardly to intersect the hinge axis 142 at 132*d* and forms an included angle of about 90 degrees with an inclined edge surface 138*b* on the hinge end 138. The outer marginal edge 134*a* of petal 134 terminates at the hinge end 138 in an inwardly tapered profile edge surface 134'*a* that has a larger angle alpha and intersects the marginal edge 134*a* at a point 134*c* closer to the hinge axis 142 than the point of intersection 132*c* of tapered edge surface 132'*a*. The tapered edge surface 134'*a* intersects the hinge axis 142 at 134*d* so as to create a greater hinge width 134*hw* than the hinge width 132*hw* of the petal 132.

As thus configured, it can be seen that the petals 132 and 134 are asymmetrical about the longitudinal centerline of reed 130. With the petal 132 having a shorter hinge width 132*hw* than the hinge width of petal 134 and overlying a lower pressure zone cage port, such as 136*a*, and with the petal 134 overlying a higher pressure zone port, such as 136*b*, selective sizing and configuration of each tapered profile edge surface 132'*a* and 134'*a* creates flex characteristics for the petals 132, 134 that enable the petal 132 to lift off its lower pressure cage port 136*a* in response to a lower pressure prior to the time that the petal 134 lifts off its cage port 136*b* in response to a higher pressure because of the reduced hinge width and complex cantilever action of petal 132 relative to petal 134.

Figure 13:
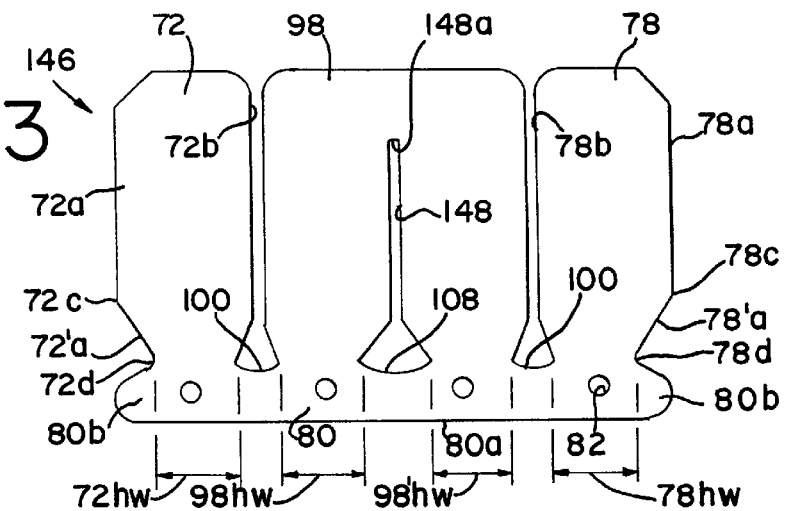
FIG. 13. is a plan view of a three petal reed constructed in accordance with another embodiment of the present invention.

FIG. 13 illustrates another embodiment of a reed, indicated generally at 146, in accordance with the present invention. The reed 146 is similar to reed 106 illustrated in FIG. 9 except that the center petal 98 has a slot opening 148 extending from the inverted diamond shaped opening 108 along the longitudinal centerline of the reed to a point 148*a* spaced from the free end of petal 98. As in reed 106, the transverse hinge widths 98*hw* and 98'*hw* of petal 98 are each of less width than the equal width hinge widths 72*hw* and 78*hw* of the outer petals 72 and 78 but the sum of hinge widths 98*hw* and 98'*hw* is greater than either of the hinge widths 72*hw* and 78'*hw* of the petals 72 and 78.

The various reeds illustrated in FIGS. 3–13 are preferably made of a bonded carbon fiber material but may alternatively be made from a fiber reinforced polymer material, such as a reinforced plastic, fiberglass or a corrosion resistant steel. The various reed petals may be uniform in thickness, or may have varying thickness from their hinge axis ends to their free tip ends to achieve flex and reflex characteristics desired for a particular reed valve and engine application. One example of a bonded carbon fiber material is available from the SGL Carbon Group of SGL/Technik, GMBH, Germany, as its Sigratex Prepreg CE 8223-100-48 formulation.

Thus, in accordance with the present invention, various reed designs are provided for use with a reed valve wherein the reeds provide multiple stage lifting of the reed petals from their closed positions with ports in a reed cage and thereby effect multiple-stage opening of the reed cage ports. In this manner, the outer petals on the various reed designs in accordance with the present invention can be customized to lift or open their corresponding reed cage ports in respect to lower pressures in the reed cage, such as occur at one or both of the cage lateral boundary side or end walls 16*a,b* at relatively low engine r.p.m., while the middle petal or petals that seal against the higher pressure zone ports of the reed cage may be established to lift or open from their respective ports in response to higher pressure as experienced with higher engine r.p.m. By providing the outer reeds with selectively tapered profile edge surfaces at their hinge areas, the flex and reflex characteristics and the complex cantilever action of the outer reeds can be established to effect predetermined lifting or opening and subsequent closing responsive to pressure changes within the reed cage during operation of an internal combustion engine with which the associated reed valves are employed.

The reeds may have uniform thickness or may have varying thickness so that, together with the reed petal hinge configurations, the reed petals resist flutter (defined as the state in which the reed petals do not fully close off their respective cage ports) at maximum engine r.p.m. (i.e. maximum back pressure) when reed oscillation tends to occur in response to reversal of the suction/pressure stroke of the piston. The thickness of the reed petals can effect the mass at the free tip ends of the petals. The tip mass of the petals can in turn affect the reflex and inertia characteristics of the petal tip ends. Thus, obtaining desired reed petal reflex for a particular engine must take into account the thickness of the petals as well as the aforedescribed reed profile considerations.

While preferred embodiments of the present invention have been illustrated and described, it will become apparent to those skilled in the art that changes and modifications may be made therein without departing from the invention in its broader aspects. Various features of the invention are defined in the following claims.

What is claimed is:

1. A reed valve comprising, in combination, a reed cage defining a plurality of ports disposed in substantially coplanar relation, said reed cage defining a fluid flow passage so that fluid entering an inlet end of said cage passes downstream to said ports, and a reed mounted at one end to said reed cage and having a plurality of petals each of which is operative to overlie and close a corresponding one of said ports, said petals each having laterally opposite generally parallel longitudinal marginal edges and being interconnected at a common hinge end thereof so as to establish axially aligned hinge axes, said petals having transverse widths at their hinge axes defined at least in part by a generally rectilinear tapered edge surface having a terminal end at the hinge axis and angled outwardly to intersect the corresponding marginal edge surface of the petal so as to create predetermined petal flex characteristics whereby selected ones of said petals lift from their port closing positions when subjected to a first predetermined fluid pressure and others of said petals lift from their port closing positions when subjected to a second predetermined fluid pressure greater than said first fluid pressure.

2. A reed valve as defined in claim 1 wherein said reed cage has a generally wedge shaped side profile and defines substantially coplanar ports facing generally upwardly and substantially coplanar ports facing generally downwardly when the reed cage is disposed in a horizontal orientation.

3. A reed valve comprising, in combination, a reed cage defining a plurality of ports disposed in substantially coplanar relation, said reed cage defining a fluid flow passage so that fluid entering an inlet end of said cage passes downstream to said ports and having laterally opposite side walls defining lateral boundaries for fluid flow through said flow passage, said ports defining laterally spaced outer ports adjacent said side walls and subjected to a first fluid pressure, and at least one port intermediate said outer ports and subjected to a second fluid pressure greater than said first fluid pressure, a reed mounted at one end to said reed cage and having a plurality of petals each of which is operative to overlie and close a corresponding one of said ports, said petals being interconnected at a common hinge end thereof so as to establish axially aligned hinge axes, said petals having selectively different transverse widths at their hinge axes to create predetermined petal flex characteristics whereby selected ones of said petals lift from their port closing positions when subjected to a first predetermined fluid pressure and others of said petals lift from their port closing positions when subjected to a second predetermined fluid pressure greater than said first fluid pressure, said petals including a pair of laterally spaced outer petals operative to overlie said outer ports and a petal intermediate said outer petals operative to overlie said intermediate port, said intermediate petal having a greater transverse hinge width than said outer petals.

4. A reed valve as defined in claim 3 wherein said outer petals have substantially equal transverse hinge widths.

5. A reed valve as defined in claim 3 wherein each of said outer petals has a first longitudinal marginal edge surface that tapers inwardly toward a longitudinal centerline of the petal adjacent its hinge axis so as to establish predetermined progressively decreasing flex in the petal in the direction away from its hinge axis when caused to lift from its corresponding reed cage port.

6. A reed valve as defined in claim 4 wherein said outer petals each has a longitudinal marginal edge surface laterally opposite said outer longitudinal edge surface, said laterally opposite marginal edge surface having a partial diamond shaped profile formed therein adjacent its said hinge axis.

7. A reed valve as defined in claim 4 wherein said outer petals and intermediate petal have mutually opposed generally parallel longitudinal marginal edge surfaces extending from free ends of said petals and terminating adjacent the corresponding hinge axis in an edge recess profile that establishes a hinge axis of less lateral width that the lateral width of the petal at its said free end.

8. A reed valve as defined in claim 7 wherein said edge recess profile is in the form of a diamond shape having a generally upwardly and inwardly inclined taper and with the maximum transverse dimension of the diamond shape lying on the transverse hinge axis of the petal.

9. A reed valve as defined in claim 7 wherein said edge recess profile is in the form of a segment of a circle having its center axis lying on a petal transverse hinge axis.

10. The reed valve as defined in claim 1 wherein said petals having selective different hinge widths.

11. The reed valve as defined in claim 1 wherein said petals have equal hinge widths.

12. The reed valve as defined in claim 1 wherein each of said petals has a hinge width defined by a pair of said rectilinear tapered edge surfaces establishing the laterally opposite ends of the hinge axis.

13. A reed comprising a flexible body defining a plurality of petals each of which has generally parallel longitudinal marginal edges, said petals being interconnected at a common hinge end thereof so as to establish axially aligned hinge axes for said petals, said petals having edge profiles adjacent said hinge end defined by at least one generally rectilinear tapered edge surface having a terminal end at the hinge axis and intersecting a corresponding longitudinal marginal edge so as to establish predetermined flex characteristics for said petals.

14. A reed as defined in claim 13 wherein said plurality of petals includes laterally outer petals having substantially equal transverse hinge widths.

15. A reed as defined in claim 14 wherein each of said outer petals has an outer longitudinal marginal edge surface that tapers inwardly toward a longitudinal centerline of the petal adjacent its hinge axis so as to establish predetermined progressively decreasing flex in the petal in the direction away from its hinge axis when caused to flex about its hinge axis.

16. A reed as defined in claim 14 wherein each of said outer petals has a longitudinal marginal edge surface laterally opposite said outer longitudinal marginal edge surface, each said laterally opposite longitudinal marginal edge surface having a partial diamond shaped profile formed therein adjacent its said hinge axis.

17. A reed as defined in claim 13 wherein said plurality of petals includes a pair of outer petals and at least one intermediate petal, said outer and intermediate petals having mutually opposed generally parallel longitudinal marginal edge surfaces extending from free ends of said petals and terminating adjacent their corresponding hinge axis in an edge recess profile that establishes a hinge axis for each of said outer petals that is of less lateral width that the lateral width of the hinge axis of said intermediate petal.

18. A reed as defined in claim 17 wherein said edge recess profile is in the form of a partial diamond shape having a tapered edge surface intersecting the corresponding longitudinal marginal edge surface and extending inwardly toward the corresponding petal longitudinal axis at the corresponding petal hinge axis and with the maximum transverse dimension of the diamond shape lying on the transverse hinge axis of the petal.

19. A reed as defined in claim 17 wherein said edge recess profile is in the form of a segment of a circle having its center axis lying on the corresponding petal hinge axis.

20. A reed as defined in claim 13 wherein said flexible body is of generally uniform thickness.

21. A reed as defined in claim 13 wherein said body defines four petals of substantially equal area when considered from free terminal ends thereof to positions generally proximate said common hinge end.

22. A reed as defined in claim 21 wherein said four petals comprise two laterally outer petals and two intermediate petals, said outer petals each having an outer longitudinal marginal edge surface terminating adjacent its corresponding hinge axis in an edge profile creating a hinge axis for each of said outer petals that is of less hinge width than the hinge widths of said intermediate petals.

23. A reed as defined in claim 22 wherein said edge profiles on said outer petals comprise tapered edge surfaces intersecting the corresponding outer longitudinal marginal edge surface and tapering toward the longitudinal axis of the corresponding petal adjacent its hinge axis.

24. A reed as defined in claim 13 wherein said body defines two laterally outer generally rectangular shaped petals and a single generally rectangular shaped intermediate petal, said intermediate petal having a transverse width substantially equal to the combined transverse widths of said outer petals.

25. A reed as defined in claim 24 wherein said outer petals are of substantially equal transverse widths and have substantially similar mirror image plan configurations.

26. A reed as defined in claim 25 wherein said intermediate petal has an opening formed therein lying on said hinge axis so as to create a split hinge axis for said intermediate petal having a combined length greater than twice the hinge width of either of said outer petals.

27. The reed as defined in claim 13 in combination with a reed cage having a plurality of substantially coplanar flow ports defining laterally spaced outer ports subjected to a first fluid pressure when said reed cage is connected to a source of fluid flow, and at least one port intermediate said outer ports and subjected to a second fluid pressure greater than said first fluid pressure when connected to the source of fluid flow, said reed being mounted on said reed cage and having a pair of laterally spaced outer petals operative to overlie and close said outer ports and at least one petal intermediate said outer petals operative to overlie and close said intermediate port, said intermediate petal having a greater transverse hinge width than said outer petals so that said outer petals lift from port closing portions when subjected to a first predetermined fluid pressure and said intermediate petal lifts from its port closing position when subjected to a second predetermined fluid pressure greater than said first fluid pressure.

28. The combination defined in claim 27 wherein said common hinge end includes a plurality of mounting holes facilitating attachment of the reed to said reed cage so that said petals extend in the direction from a fluid inlet end to a fluid outlet end of said reed cage.

29. The combination defined in claim 27 wherein said outer ports and said intermediate port are rectangular, each of said petals being generally rectangular and adapted to overlie and close a predetermined corresponding one of said ports.

30. The combination defined in claim 27 wherein said reed cage defines two ports intermediate said outer ports, said reed having two petals intermediate said outer petals operative to overlie said two intermediate ports, said intermediate petals being of substantially similar size and having hinge widths greater than the hinge widths of said outer petals.

31. The combination defined in claim 27 wherein said reed cage defines two ports intermediate said outer ports, said reed having a single petal intermediate said outer petals, said single intermediate petal being sized to overlie and close said two intermediate reed cage ports and being responsive to said second predetermined fluid pressure to lift from and open said two intermediate ports.

32. The combination defined in claim 27 including reed stop means mounted on said reed cage for limiting lifting movement of said petals from said port closing positions.

33. The combination as defined in claim 32 wherein said reed stop means comprises at least one reed stop having an arcuate side profile curvature and secured at one end to the reed cage so as to overlie said reed in progressively greater spaced relation in a direction considered from said secured end, said reed stop being configured to allow predetermined limited lifting movement of said petals from their corresponding ports.

* * * * *